(12) United States Patent
Hruška et al.

(10) Patent No.: US 9,377,548 B2
(45) Date of Patent: Jun. 28, 2016

(54) WAVELET-TRANSFORM BASED SYSTEM AND METHOD FOR ANALYZING CHARACTERISTICS OF A GEOLOGICAL FORMATION

(75) Inventors: Marina Hruška, San Ramon, CA (US); David Katz, Oakland, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 939 days.

(21) Appl. No.: 13/292,891

(22) Filed: Nov. 9, 2011

(65) Prior Publication Data

US 2013/0116925 A1 May 9, 2013

(51) Int. Cl.
| | |
|---|---|
| G01V 3/38 | (2006.01) |
| G01V 1/30 | (2006.01) |
| G01V 1/28 | (2006.01) |
| E21B 49/00 | (2006.01) |
| G01V 1/32 | (2006.01) |

(52) U.S. Cl.
CPC ............... *G01V 1/301* (2013.01); *E21B 49/00* (2013.01); *G01V 1/28* (2013.01); *G01V 1/306* (2013.01); *G01V 1/32* (2013.01)

(58) Field of Classification Search
USPC .................................................. 702/2, 6, 11
See application file for complete search history.

(56) References Cited

U.S. PATENT DOCUMENTS

| | | | |
|---|---|---|---|
| 5,663,929 A | 9/1997 | Pavone et al. | |
| 6,088,656 A | 7/2000 | Ramakrishnan et al. | |
| 6,745,129 B1 * | 6/2004 | Li et al. | 702/17 |
| 7,295,928 B2 | 11/2007 | Hassan et al. | |
| 7,647,182 B2 | 1/2010 | Hassan et al. | |
| 2002/0183932 A1 * | 12/2002 | West et al. | 702/14 |
| 2004/0122634 A1 * | 6/2004 | Calvert et al. | 703/2 |
| 2004/0260480 A1 * | 12/2004 | Castellane et al. | 702/27 |
| 2006/0074825 A1 * | 4/2006 | Mirowski | 706/20 |
| 2007/0027629 A1 | 2/2007 | Hassan et al. | |

(Continued)

FOREIGN PATENT DOCUMENTS

| | | |
|---|---|---|
| GB | 2345776 A | 7/2000 |
| WO | WO2009126453 | 10/2009 |

OTHER PUBLICATIONS

Katz, D.A, Playton, T, Bellian, J, Harris, P.M, Harrison, C, and Maharaja, A, 2010, "Slope Heterogeneity and Production Results in a Steep-sided Upper Paleozoic Isolated Carbonate Platform Reservoir, Karachaganak Field, Kazakhstan", SPE 139960.

(Continued)

*Primary Examiner* — Paul D Lee
(74) *Attorney, Agent, or Firm* — Shubhrangshu Sengupta; Marie L. Clapp

(57) ABSTRACT

A method for analyzing characteristics of a geological formation includes obtaining at a processor data representative of at least one of stratigraphic, structural, or physical characteristics of the geological formation, applying at the processor a wavelet transform to at least a portion of the obtained data or data interpreted or derived from the obtained data to derive one or more wavelet transform coefficients representative of the obtained data, segmenting at the processor at least one or more of the obtained data or data interpreted or derived from the obtained data into segments, determining at the processor a measure of variability of the obtained data or the data interpreted or derived from the obtained data over each segment at one or more scales of the wavelet transform.

23 Claims, 11 Drawing Sheets

(56) References Cited

U.S. PATENT DOCUMENTS

| | | | |
|---|---|---|---|
| 2007/0112521 | A1 | 5/2007 | Akimov et al. |
| 2009/0030614 | A1 | 1/2009 | Carnegie et al. |
| 2009/0055097 | A1* | 2/2009 | Kowalik et al. .................. 702/6 |
| 2009/0138202 | A1 | 5/2009 | Tang et al. |
| 2009/0192713 | A1 | 7/2009 | Fang et al. |
| 2009/0204327 | A1 | 8/2009 | Lu et al. |
| 2009/0254281 | A1 | 10/2009 | Hruska et al. |
| 2009/0262603 | A1 | 10/2009 | Hurley et al. |
| 2009/0292475 | A1* | 11/2009 | Alam et al. ..................... 702/14 |
| 2010/0161228 | A1 | 6/2010 | Heliot et al. |
| 2010/0186950 | A1 | 7/2010 | Neelamani et al. |
| 2010/0226590 | A1* | 9/2010 | Yoo et al. ...................... 382/275 |
| 2011/0038559 | A1 | 2/2011 | Sugiura et al. |
| 2012/0090834 | A1* | 4/2012 | Imhof et al. ............. 166/250.01 |
| 2012/0147702 | A1* | 6/2012 | Valero et al. .................... 367/31 |
| 2012/0209526 | A1* | 8/2012 | Imhof ............................... 702/5 |

OTHER PUBLICATIONS

Hruška M, Corea, W, Schweller, W, Seeburger, D. and Crane, W.H., 2009, "Automated Segmentation of Resistivity Image Logs Using Wavelet Transform", Mathematical Geosciences, vol. 41, p. 703-716.

Mallat, S, 1998, "A Wavelet Tour of Signal Processing", Academic Press. pp. 6-9, 67-112, 143-183, 225-227 and 249-257.

Prokoph, A. and Agterberg, F, 1999, "Detection of Sedimentary Cyclicity and Stratigraphic Completeness by Wavelet Analysis: An Application to Late Albian Cyclostratigraphy of the Western Canada Sedimentary Basin", Journal of Sedimentary Research, vol. 69, p. 862-875.

Robail, F, Rabiller, P. and Schulbaum, L, 2001, "Sedimentary Bodies Identification Using the Phase Coefficients of the Wavelet Transform", SPWLA 42$^{nd}$ Annual Logging Symposium, paper W.

Daubechies, I., 1988, "Orthonormal Bases of Compactly Supported Wavelets", Communications on Pure and Applied Mathematics, vol. XLI, p. 909-996.

Mallat, S., 1989, "A Theory for Multiresolution Signal Decomposition: The Wavelet Representation", IEEE Transactions on Pattern Analysis and Machine Intelligence, vol. 11, p. 674-693.

Press, W.H., Teukolsky, S.A., Vetterling, W.T., and Flannery, B.P., 1992, "Numerical Recipes in C", Cambridge University Press. pp. 591-604 and 650-654.

Lu P., 2001 Reservoir Parameter Estimation Using Wavelet Analysis., p. 49 and 77.

Lu-PhD—2001 Reservoir Parameter Estimation Using Wavelet Analysis Lu P 2001.

DeMatos—2007 Unsupervised seismic facies analysis using wavelet transform and self-organizing maps DeMatos M C et al 2007.

Sahni-PhD—2006 Multiresolution Reparameterization and Partitioning of Model Space for Reservoir Characterization Sahni I 2006.

Lu-2000 A Multiresolution Approach to Reservoir Parameter Estimation Using Wavelet Analysis Lu P et al 2000.

Linek—2007 Rock classification based on resistivity patterns in electrical borehole wall images Linek M et al 2007.

Briqueu—2007 Modelling the stochastic component of geophysical downhole measurements using scaling process. Extraction of new attributes by Continuous Wavelet Transform. Briqueu L et al 2007.

PCT Notification of Transmittal of the International Search Report and the Written Opinion of the International Searching Authority or the Declaration regarding PCT/US2012/060355 dated Feb. 18, 2013 (11 pgs.).

Extended European Search Report and Written Opinion, International Application No. PCT/US2012/060355, dated Jun. 25, 2015.

* cited by examiner

WAVELET-TRANSFORM BASED SYSTEM AND METHOD FOR ANALYZING CHARACTERISTICS OF A GEOLOGICAL FORMATION

FIELD

The present invention relates generally to analyzing characteristics of a geological formation and more particularly to determination of stratigraphic, structural, or physical classification of a geological formation using wavelet transform.

BACKGROUND

Geological formations commonly exhibit depositional heterogeneity, which makes determination of distribution of reservoir properties challenging.

Accordingly, what is desirable is a method and system that analyzes physical or stratigraphic characteristics of a geological formation automatically with a high degree of consistency and accuracy.

SUMMARY

An embodiment includes a method for analyzing characteristics of a geological formation. The method includes obtaining at a processor data representative of at least one of stratigraphic, structural, or physical characteristics of the geological formation, applying at the processor a wavelet transform to at least a portion of the obtained data or data interpreted or derived from the obtained data, including but not limited to data derived from the interpreted data, to derive one or more wavelet transform coefficients representative of the obtained data, segmenting at the processor at least one or more of the obtained data or data interpreted or derived from the obtained data into segments, determining at the processor a measure of variability of the obtained data or the data interpreted or derived from the obtained data over each segment at one or more scales of the wavelet transform, wherein the measure of variability is based at least on the wavelet transform coefficients corresponding to each segment, and analyzing at the processor each segment based on the determined measure of variability to produce a stratigraphic, structural, or physical classification of the geological formation.

Another embodiment includes a computer readable medium having stored thereon instructions for analyzing characteristics of a geological formation comprising machine executable code which when executed by at least one processor, causes the processor to perform steps comprising obtaining at a processor data representative of at least one of stratigraphic, structural, or physical characteristics of the geological formation, applying at the processor a wavelet transform to at least a portion of the obtained data or data interpreted or derived from the obtained data to derive one or more wavelet transform coefficients representative of the obtained data, segmenting at the processor at least one or more of the obtained data or data interpreted or derived from the obtained data into segments, determining at the processor a measure of variability of the obtained data or the data interpreted or derived from the obtained data over each segment at one or more scales of the wavelet transform, wherein the measure of variability is based at least on the wavelet transform coefficients corresponding to each segment, analyzing at the processor each segment based on the determined measure of variability to produce a stratigraphic, structural, or physical classification of the geological formation, and storing in a memory device the stratigraphic, structural, or physical classification of the geological formation.

DESCRIPTION OF THE DRAWINGS

Other features described herein will be more readily apparent to those skilled in the art when reading the following detailed description in connection with the accompanying drawings, wherein.

DETAILED DESCRIPTION

Geological formations commonly exhibit depositional, structural or physical heterogeneity. The type of depositional or physical heterogeneity may be described by facies, or classes, a concept useful in modeling oil and gas reservoirs. Structural heterogeneities, such as fractures, are sometimes described quantitatively by fracture density, which gives a localized estimate of the number of fractures per unit depth. Regions of high fracture density may be flagged in a qualitative manner by visual analysis, resulting in a classification with two or more classes, labeled, e.g., "0" for low presence of fractures, and "1" for high presence of fractures. Such regions of high fracture density are in certain depositional environments of interest for oil and gas exploration.

Distribution of reservoir properties in modeling slope environments of carbonate fields is often challenging due to depositional heterogeneity. Recently, geologic interpretation linking analog outcrop observations with seismic-scale architecture, core data and well-log interpretation has been applied to classification of slope facies. Some of the stratigraphic and physical properties of platform facies, upper, middle, and lower slope facies have been established in manual tying of different types of data.

Figure 1:
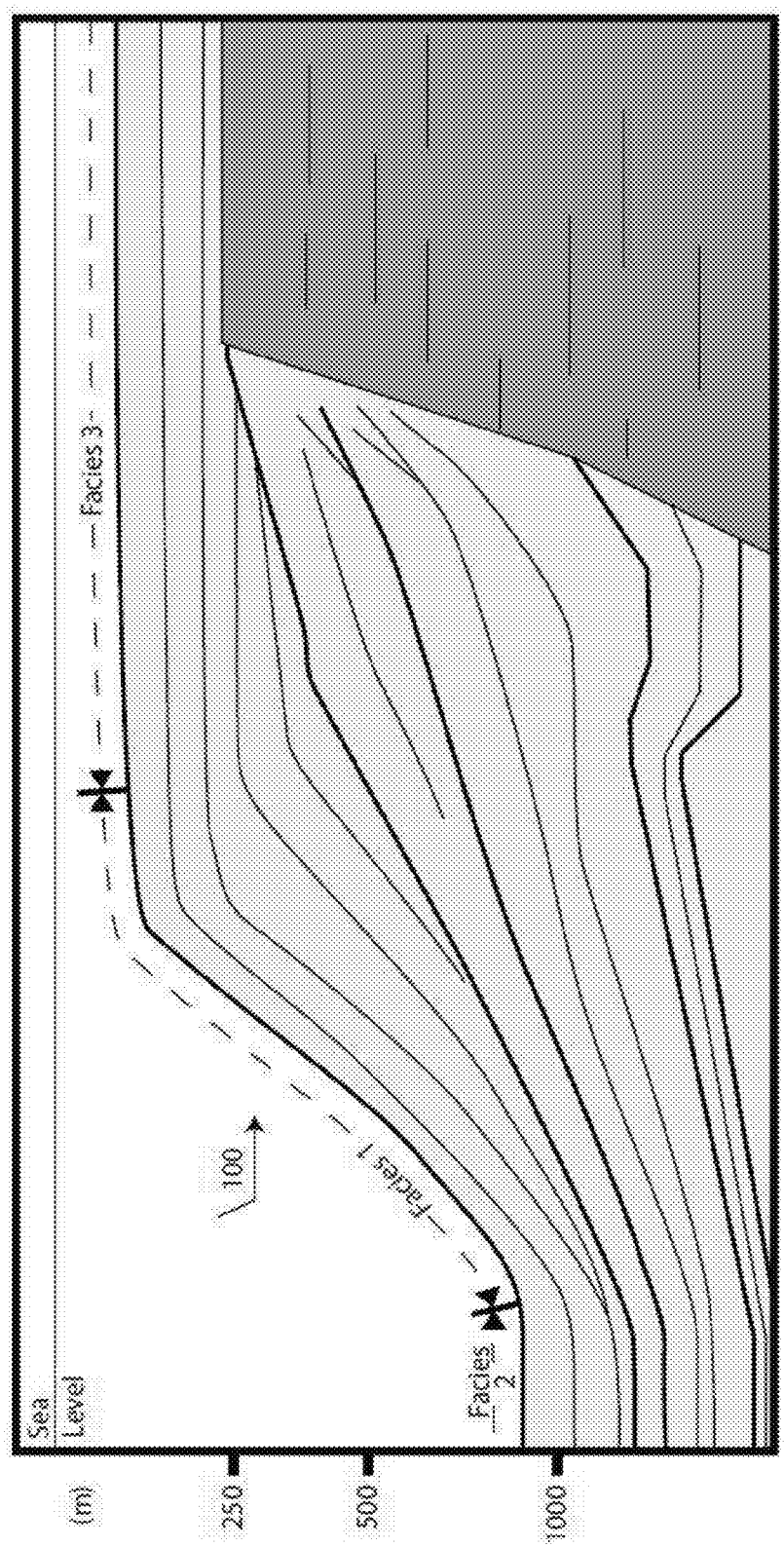
FIG. 1 is an illustration of an exemplary geological formation that is to be analyzed, in accordance with an embodiment.

FIG. 1 schematically illustrates an example of a facies structure of an exemplary geological formation 100 that was originally deposited below sea-level in a tropical marine environment. In this example, the facies structure broadly includes three facies shown as facies 1, facies 2, and facies 3, although other numbers of facies may be present in other geological formations. Geological formation 100 includes an outcrop formation but may also be representative of subterranean carbonate slope formations. Data associated with the stratigraphic, structural, and/or physical characteristics of geological formation 100 is collected and analyzed. Such collection of data may be performed manually, using visual inspection of images or on-site, for example, or using measurement probes, or combinations of these techniques. Further, data obtained may be processed using a processor in a computing system or device, and further analysis can be carried out on data interpreted or derived from the obtained data associated with the characteristics of geological formation 100. Examples of stratigraphic data interpreted from geologic formations include bedding dip or stratigraphic dip, depositional facies, and morphological elements of the depositional environment derived from juxtaposition rules of depositional facies.

Figure 2:
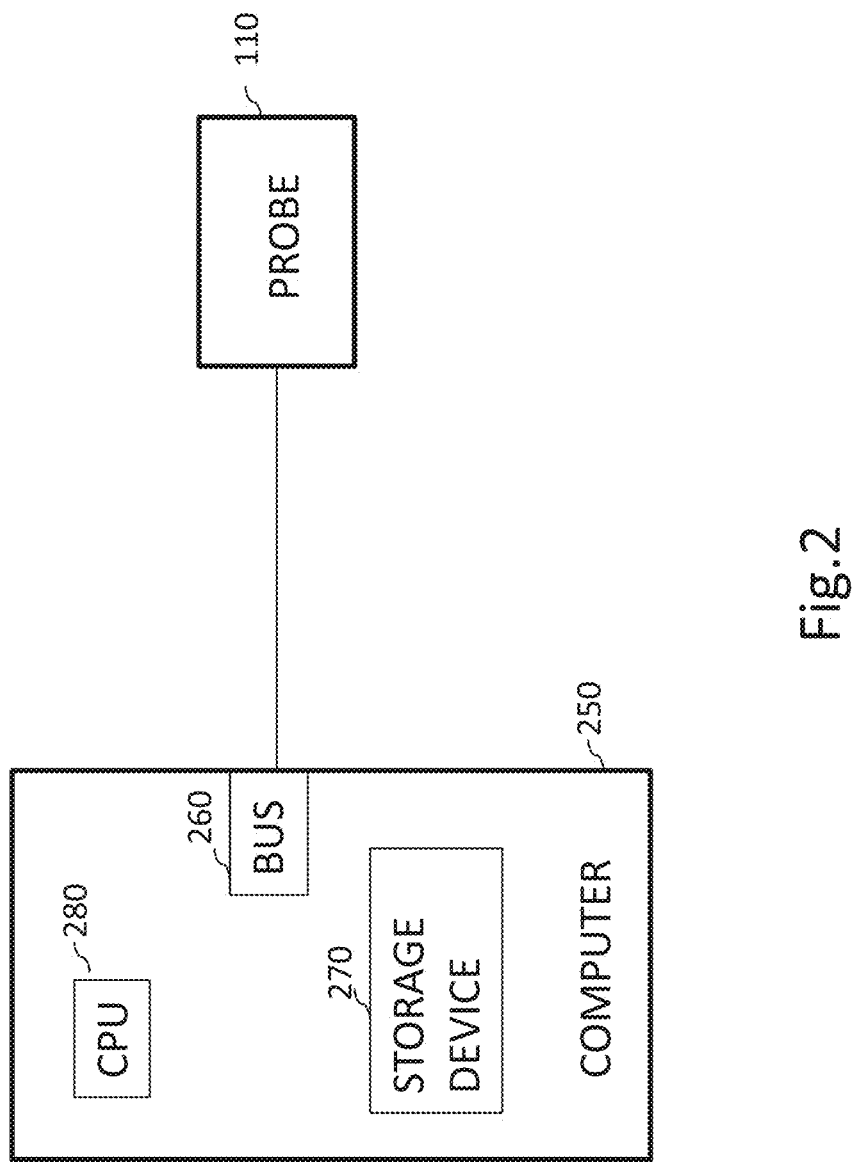
FIG. 2 is a schematic illustration of a probe in communication with a computer, in accordance with an embodiment.

As shown in FIG. 2, data obtained by a probe 110 (e.g., borehole data), and/or data interpreted or derived therefrom, are generally stored in a local memory device or relayed via a wire, though the connection may be made wireless, to a computer 250 that may be, for example, located at a drilling facility where the data may be received via a bus 260 of the computer 250, which may be of any suitable type, and stored, for example, on a computer readable storage device 270 such as a hard disk, optical disk, flash memory, temporary RAM storage or other media for processing with a processor 280 of the computer 250. Examples of data interpreted or derived from the measured data provided by probe 110 include stratigraphic dip interpretation log from resistivity image, interpolated and filtered stratigraphic dip interpretation log, or a log obtained from the resistivity image log by linear filtering, such as by wavelet transform. It is to be noted that even though borehole data is being discussed here, other types of data obtained directly from visual inspection of geological formation 100, or data derived or interpreted therefrom, could be used to analyze physical and stratigraphic characteristics of geological formation 100, as discussed below.

Figure 3:
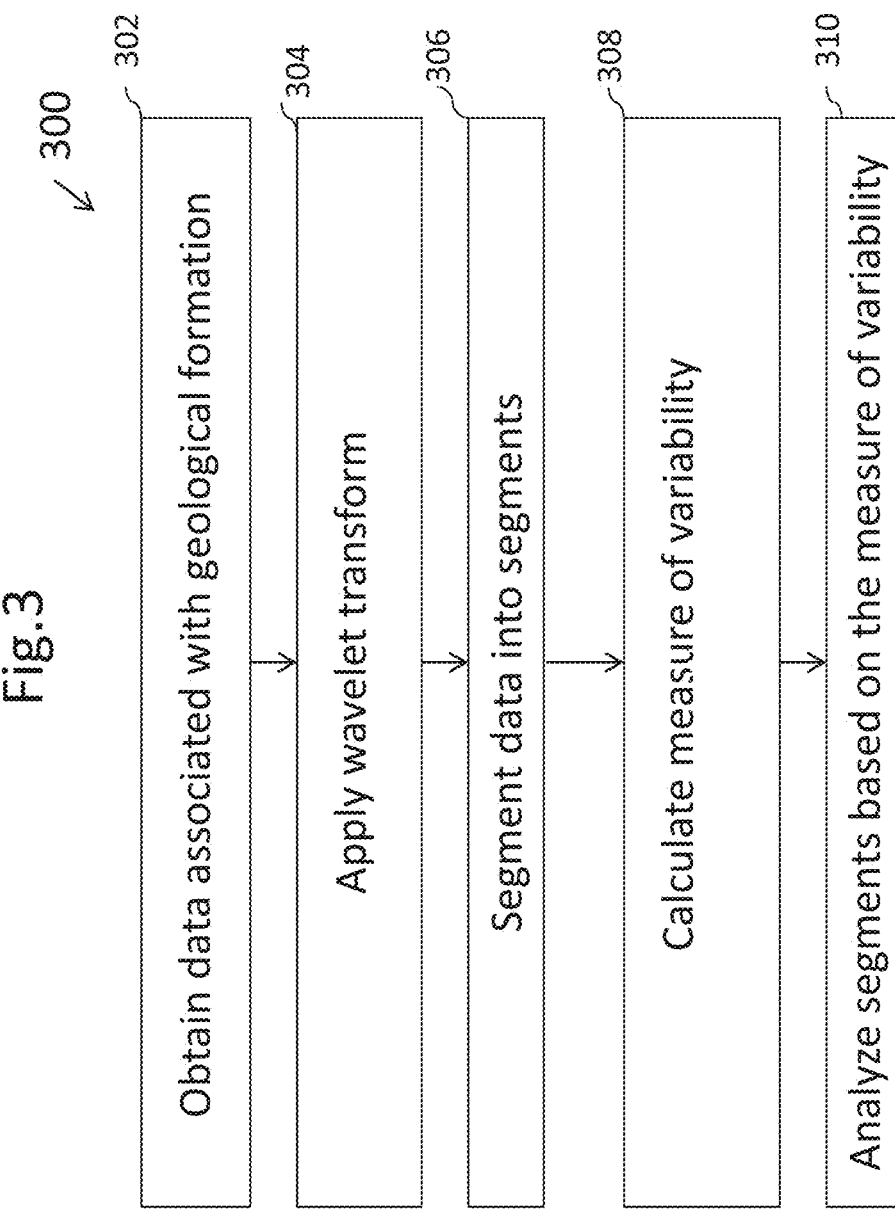
FIG. 3 is a flowchart of a method for analyzing characteristics of a geological formation, in accordance with an embodiment.

FIG. 3 generally shows a flowchart 300 for a method for analyzing characteristics of geological formation 100 in accordance with an embodiment. The flowchart 300 in FIG. 3, as well as subsequent flowcharts in FIGS. 4-8, are representative of example machine readable instructions for implementing the method for analyzing characteristics of geological formation 100. The steps or processes described below for the flowchart 300 are example machine readable instructions for implementing a method in accordance with the embodiments described in this disclosure. In one example, the machine readable instructions include an algorithm for execution by: (a) a processor, (b) a controller, and/or (c) one or more other suitable processing device(s). The algorithm can be instantiated in software stored on tangible media, for example, a flash memory, a CD-ROM, a floppy disk, a hard drive, a digital video (versatile) disk (DVD), blue-ray disk, or other memory devices, but persons of ordinary skill in the art will readily appreciate that the entire algorithm and/or parts thereof could alternatively be executed by a device other than a processor and/or embodied in firmware or in dedicated hardware. For example, the algorithm can be implemented by an application specific integrated circuit (ASIC), a programmable logic device (PLD), a field programmable logic device (FPLD), a field programmable gate array (FPGA), discrete logic, and the like. For example, any or all of the components of the method for analyzing characteristics of geological formation 100 could be implemented by software, hardware, and/or firmware. Also, some or all of the machine readable instructions described herein can be implemented manually. Further, although an embodiment of the present invention is described and illustrated herein in the flowcharts, persons of ordinary skill in the art will readily appreciate that many other methods of implementing the example machine readable instructions can alternatively be used. For example, the order of execution can be changed in some steps, and/or some of the steps described can be changed, eliminated, or combined depending on specific geological formations, for example.

Figure 9:
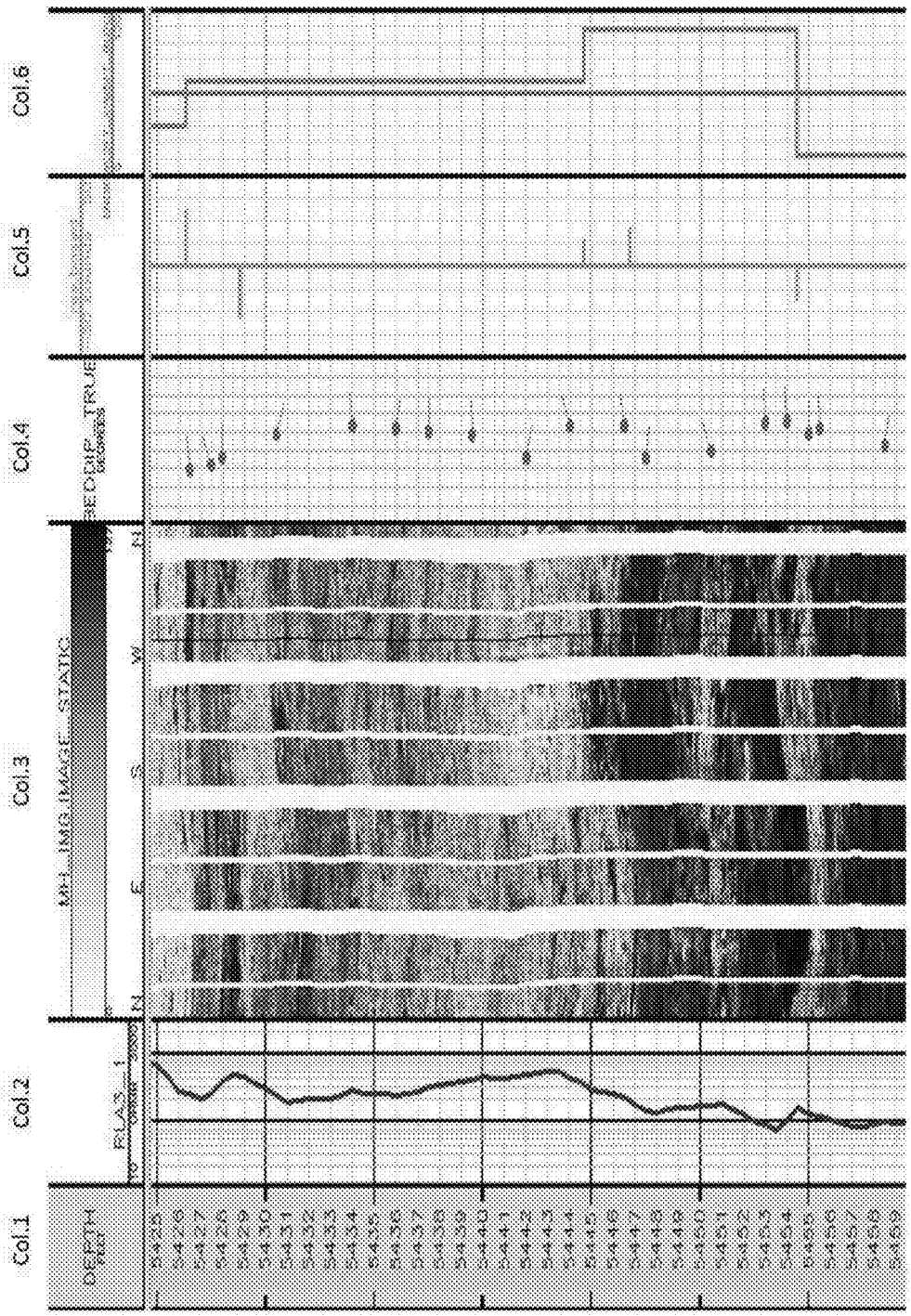
FIG. 9 illustrates plots of exemplary data used for predicting slope facies, in accordance with an embodiment.

Referring now to FIG. 3, in block 302 processor 280 carries out obtaining data representative of one or more physical, structural, or stratigraphic characteristics of geological formation 100. In one embodiment, processor 280 obtains data from probe 110, remotely or locally for processing and deriving or interpreting data from the obtained data. Such obtained data includes, by way of example only, a stratigraphic dip interpretation, a resistivity or a conductivity, and/or a porosity of geological formation 100. Data obtained by processor 280 may be converted to a graphical form, as image data for display and/or further processing. The graphical data may be stored as full-color data (for example, 24-bit JPEG data) or may be single color or gray-scale data. Image data (or image logs) may represent resistivity traces obtained at each of a plurality of positions in a borehole using, for example, a tool such as FULLBORE FORMATION MICROIMAGER (FMI)™ tool from Schlumberger of Houston, Tex. The resistivity traces derived from the obtained data are normalized by processor 280. A color may be assigned to a measured or processed resistivity value to get a picture in resistivity. Image data can include a number of stripes, e.g., with eight stripes running down column 3 in FIG. 9, for example, in a representation of an unwrapped cylindrical surface of a borehole wall. These eight stripes represent FMI™ data from the eight sensor pads obtained with the probe 110, with each sensor pad providing twenty-four data traces, although other number of traces and pads could be used, depending on the tool and the mode of display. For example, the color or contrast scale may be chosen in such a way that the darker areas of the image data in column 3 of FIG. 9 represent relatively conductive regions and the lighter areas represent relatively resistive regions. An image contrast may appear as a result of varying porosity and fluid type or water salinity in the formation, as oil and freshwater are highly resistive, while saltwater is highly conductive, and a rock of very low porosity has less of conductive pathways than a highly porous rock filled with brine. Inhomogeneous features in the image around the borehole wall may be due to openings in the borehole wall filled with drilling mud, which can be water-based (conductive) or oil-based (resistive). Open fractures may therefore appear as bright or dark features, depending on the relative resistivity of the drilling mud and formation. Healed or cemented, or partially cemented fractures may show contrast, depending on the resistivity of their filling. Geometrically, fracture features in images are sinusoidal or near-sinusoidal features or parts of such features (for partially healed or cemented fractures), as fractures are planar features intersecting a cylindrical or nearly-cylindrical borehole wall.

In block 304, according to one embodiment, data obtained from geological formation 100, and/or data interpreted or derived therefrom, or portions thereof, are analyzed for determining physical, stratigraphic, and/or other characteristics of geological formation 100 using wavelet transform techniques applied at processor 280. The wavelet transform is a linear transform which convolves the original signal (e.g., from probe 110) or the data interpreted or derived therefrom with a family of functions or wavelets of zero mean that satisfy a known admissibility condition. The functions belonging to a wavelet family are of a mutually similar shape but translated and/or dilated in the time (or depth) variable. The result of a wavelet transform is termed by wavelet coefficients which are indexed by position and scale. A family of wavelets is obtained from the mother wavelet $\psi(t)$ by shifting it by a numerical value x and scaling it by a numerical value a, as shown in equation (1):

$$\psi_{a,x}(t) = \frac{1}{\sqrt{a}} \psi\left(\frac{t-x}{a}\right) \quad (1)$$

Once a family of wavelets is chosen, then the continuous wavelet transform of a function $f(t)$ is defined as (shown here for real functions $f(t)$, $\Psi(t)$) in equation (2):

$$Wf(x, a) = \frac{1}{\sqrt{a}} \int_{-\infty}^{\infty} f(t) \psi\left(\frac{t-x}{a}\right) dt \quad (2)$$

where $Wf(x,a)$ are the wavelet coefficients. For some applications, one may choose to restrict the values of the parameters a,x in Eq. (2) to discrete values, obtained as $a=a_0^m$, $x=n \cdot x_0 \cdot a_0^m$, where $a_0>1$ is a dilation step, $x_0 \neq 0$ is a translation step, and m, n are whole numbers. A discrete wavelet transform is associated with the discrete wavelets, as is known to one of ordinary skill in the art.

Most applications of wavelet families exploit their ability to efficiently approximate particular classes of functions with few non-zero wavelet coefficients. Coefficients of a small magnitude at finest scales are generally corresponding to smooth parts of the signal, while e.g., abrupt signal changes are generally accompanied by wavelet coefficients having local maxima or minima of a large magnitude around locations of such changes.

In one embodiment, the wavelet transform is performed with a Daubechies wavelet with two vanishing moments, although other types of mother wavelets (e.g., a Morlet wavelet) may be used, as may be contemplated by one of ordinary skill in the art in view of this disclosure. In yet another embodiment, the obtained data or properties interpreted or derived therefrom are depth-readjusted after applying the wavelet transform, for cases of resistivity images of moderate to high apparent dip.

In block 306, segmenting at least one or more of the obtained data or data interpreted or derived from the obtained data into one or more segments is carried out by processor 280. An initial segmentation may be performed, for example, by wavelet-transform based resistivity image segmentation, or by another available segmentation method known to one of ordinary skill in the art and found to be sufficiently sensitive for the data at hand, or by simple uniform splitting in those cases where loss of a facies boundary location accuracy is not a concern. Blocks 306 and 304 can be interchanged, for example, if wavelet transform is not used for segmentation. Segments shorter than a length of characteristic variations in properties of interest, as discussed below in relation to measure of variability, may undergo lumping with adjacent segments, to avoid computing a misleadingly high measure of variability which can arise in segments with statistically too few samples. In one embodiment, this length is 3 ft.

In block 308, a measure of variability v of the obtained data or the data interpreted or derived from the obtained data over each segment at one or more scales of the wavelet transform is determined by processor 280. In one embodiment, the measure of variability is based at least on the wavelet transform coefficients corresponding to each segment. In other embodiments, additional parameters such as a standard deviation may be used by processor 280 to calculate the measure of variability. The measure of variability of the measured data or one or more properties interpreted or derived from the measured data is obtained as a segment average of squares of magnitude of wavelet transform coefficients at the one or more scales of the wavelet transform. In one embodiment, the measure of variability of a function $f(x)$, which represents the measured data or a property interpreted or derived from the measured data, including data derived from the interpreted data, over a segment is calculated as:

$$v = \frac{1}{N} \sum_i |Wf(x_i, a)|^2 \quad (3)$$

where $Wf(x_i,a)$ is a wavelet coefficient of function $f(x)$ at scale a at point $x_i$ and N is the number of sampled points $x_i$, i=1 ... N in the given segment. In the case when the function $f(x)$ depends on two variables (as when exploring the azimuth dependence of a resistivity image), Eq. (3) is modified to include summation over the azimuth-related variable and the coefficients pertain to a two-dimensional wavelet transform. Depending on the application and type of data, the discrete wavelet coefficients at scale a in Eq. (3) may contain only the detail wavelet coefficients, or "mother-function" coefficients, or both, as is known to one of ordinary skill in the art. The latter coefficients are obtained by smoothing the signal $f(x)$ with a smoothing function at a corresponding scale (a rescaled smoothing function). In the case of an orthogonal discrete wavelet transform, a detail wavelet coefficient at scale $a=a_0^m$ at point $x_i$ is obtained as the difference of the signal smoothed at two successive scales $a_0^{m+1}$ and $a_0^m$. In this embodiment, the measure of variability is calculated for a discrete wavelet transform at a single scale a. However, it will be appreciated that a more general measure of variability can be calculated as a double sum over scale $a_m=a_0^m$ and over coordinate $x_i$, where the scales in the sum span a range of length scales over which the signal has significant variations in regions of facies which is to be characterized by a high measure of variability. This facies is, in the case of slope facies, referred to as the "first facies", though it will be appreciated that more generally any facies can be chosen to be identified in this way if given a property with a high measure of variability in regions where this facies is present. It will also be appreciated that an analogous measure of variability may be used in our method, whereby the measure of variability is calculated as a double integral over scale and coordinate taken as continuous variables (in a continuous wavelet transform of the measured signal, or signal interpreted or derived therefrom).

For a function $f(x)$ which has very large values in the region of the first facies compared to all other regions, a measure of variability which includes the mother-function wavelet coefficients may be advantageous, while a function which has a similar segment average in the region of the first facies as elsewhere is better identified by a measure of variability which includes only detail coefficients. For a signal which is a constant in a region, its smoothed version is the same as the original one at all points away from the region edge, on scales smaller than the distance to the edge, so that its detail coefficients at such points are zero, while the mother-wavelet coefficients need not be.

The knowledge of length scales over which the signal has significant variations for a particular facies ideally comes from regions of calibration with core, i.e., regions where it is known a priori that this facies is present. For example, scales can be from 1/32 ft to 32 ft. In one embodiment, wavelet transform coefficients are used to calculate a variability measure of the interpolated and smoothed dip interpretation log. The one or more scales of wavelet transform coefficients used for the variability measure of the smoothed interpolated dip interpretation log are of an order of scale for stratigraphic dip changes of geological formation 100. For example, the order of scale for stratigraphic dip changes in one embodiment is in a range of 1 to 32 ft, although other ranges could be used depending upon specific structure of geological formation 100. In applying wavelet transform to the resistivity image in the embodiment of fracture zone detection, scales from 1/32 ft to 10 ft may be used. Small scales in this range are appropriate for detecting fractures which in image appear more resistive than the formation. For example, this is generally the case of open fractures in shale in a well drilled with an oil-based drilling mud. Large scales in this range may be useful for example for dissolution-enlarged fractures in wells drilled with a water-based mud in a highly resistive formation.

In an embodiment, the scales may be visually selected by looking at the fine-scale variations of the image data logs that can be geologically interpreted (i.e., without considering the noise-related variations). That is, a few scales are chosen as representative of variabilities within segments in which this facies occurs. These scales may be limited by the resolution of the well-logs analyzed. Additional and/or different scales may be selected for different geological environments. Selection of the scales may also be automated with a software or program that automatically performs a search for the most relevant length scale by maximization of a variability measure as a function of scale, over a part of data known to exhibit geological variations of interest, or by another method. Variability measure in this case may be normalized at each scale prior to comparison to other scales. Normalization may be done by an average variability measure at given scale over all data.

Obtained data from probe 110 or portions thereof can be filtered over the scale selected for calculation of variability measure or a comparable scale to eliminate noise, as by low-pass filtering. For example, the smoothed interpolated interpreted stratigraphic dip log can be obtained by interpolating and smoothing stratigraphic dips which were picked by a geologist from a resistivity image or picked by automated analysis tools known to one of ordinary skill in the art. To avoid obtaining an erroneously large measure of dip variability in geologic regions where noise in image may have affected the accuracy of dip picking (especially at high dips), the interpolated interpreted dip log may be smoothed prior to the calculation of wavelet transform. The scale for smoothing is chosen in the range of 1 to 10 ft, depending on the largest length scale on which noise appears to be affecting dip picking.

In block 310, processor 280 analyzes the computed measure of variability in each segment to produce a stratigraphic, structural or physical classification of geological formation 100. Analysis of the measure of variability has at its core a comparison of segments based on their measure of variability of a property, which allows ranking the segments. To put the ranking in a context i.e. identify meaningful thresholds to separate facies based on having a higher or a lower measure of variability of a first property, this analysis may either impose as a threshold an average measure of variability of this property for all segments (or another global or local statistic for the measure of variability of this property), or it can involve identification of a starting segment for at least one facies, other than the facies ("the first facies") for which the measure of variability of the first property is expected to be the highest among all facies. The starting segment is chosen as a representative segment of the corresponding facies according to a particular property, which is implemented specifically as selection by highest or lowest value or having only values in a particular range (this criterion being called "a distinguishing condition") for the segment average of this property among all segments. It will be appreciated, that a property can be defined for this purpose as a measure of variability of another property (other than the first property).

In one embodiment, segmented data obtained in block 306 of FIG. 3 are classified as belonging to the first facies in an order of decreasing measure of variability of the first property until a stopping condition is met. By way of example only, the stopping condition can state that the measure of variability of the first property over a segment currently under consideration to be classified is lower than a value of the measure of variability of the first property over at least one of the segments previously classified as belonging to facies other than the first facies.

For a facies classification based on the measure of variability of resistivity image, the analysis of the measure of variability may involve identification of a facies with an expected high measure of variability of resistivity image (for example, a highly fractured region) in all segments which have the measure of variability higher than a particular value (or, threshold) and identifying all other segments as belonging to the other facies. The threshold in one embodiment is determined as the highest value of measure of variability in the starting segments of all other facies.

In the case of a slope facies classification, the analysis of a measure of variability is a multi-step procedure where a first, coarse classification is carried out, followed by a step-wise reclassification of different facies in geological formation 100 to improve accuracy of the final classification. The coarse classification involves identification of a starting segment of at least one other facies, and identifying a boundary between each two facies which have their starting segments situated the closest, at one of the boundaries of segments which are in-between these starting segments. For facies with starting segments which are the first or the last starting segments in the data sequence, they may be assigned a boundary closer than the respective end of the data, in order to avoid assigning all segments through that end of data to the facies of this starting segment in cases when such assigning would give a block of segments for which a distinguishing condition of the respective property is not satisfied. Thus, a potentially low-quality data at data ends is excluded from classification. A step-wise reclassification is done to allow also for the phenomenon of reentrance, where e.g. an upper slope facies, while usually occurring above a lower slope facies segments, may occur below a lower slope facies.

Figure 4:
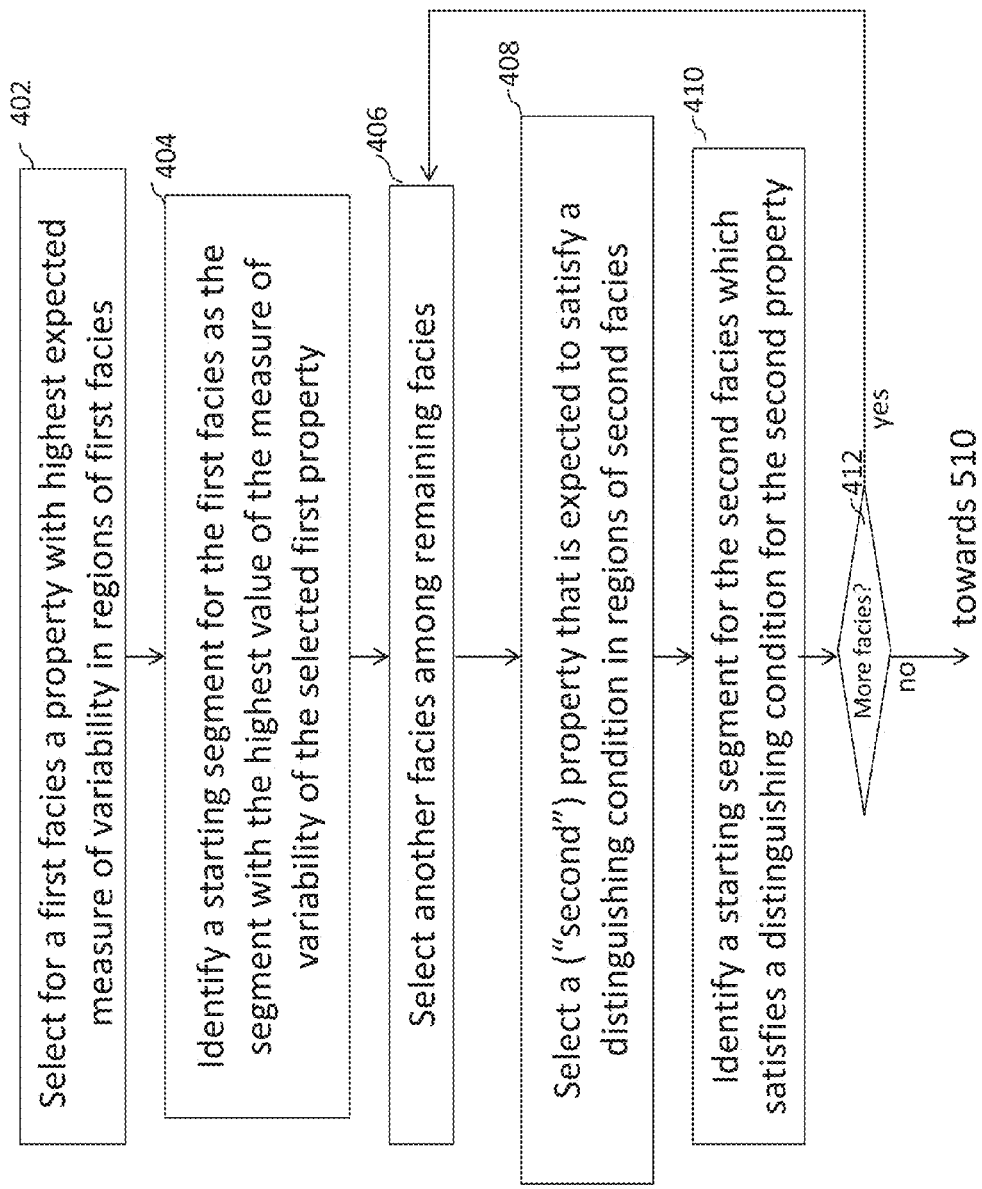
FIG. 4 is a flowchart showing details of the method in FIG. 3, in accordance with an embodiment.

The analysis of the obtained data using the measure of variability is described in more detail in FIG. 4. In block 402, processor 280 carries out selecting for a first facies, in a plurality of facies of geological formation 100, a first property among the one or more properties interpreted or derived from the obtained data that has an expected or known highest measure of variability for the first facies. In one embodiment, the first facies is a middle slope facies, and the first property is stratigraphic dip interpretation in a carbonate environment. The stratigraphic dip could be interpreted either from a resistivity image log or from a reasonably close outcrop in the case when a resistivity image log is not available. In another embodiment, the first property is derived from either a resistivity image log, a density image log, or an acoustic image log. Examples of a first property may include a normalized image as a function of depth and of sensor number around the borehole, while examples of a second property may include the width of a wavelet coefficient distribution derived for wavelet coefficients of image values at a given depth or in a segment centered at that depth. For an acoustic image log, either the amplitude image or the time image may be used. In block 404, processor 280 carries out identifying a segment having a highest or a maximum value of the measure of variability of the selected first property among all segments as a starting segment for the first facies. For example, for the middle slope facies, the segment with the highest dip variability is identified as the starting segment for the middle slope facies. In block 406, processor 280 carries out selecting one of remaining facies, different from the previously selected first facies in the plurality of facies. The remaining facies are lower slope, upper slope, and platform facies, when the first facies selected in block 402 is middle slope facies.

In block 408, processor 280 carries out selecting a property (referred to as a second property) among the one or more properties that is expected from prior geologic knowledge to satisfy a distinguishing condition including either an expected range of segment average, a maximum segment average value, or a minimum segment average value for the selected facies over regions belonging to the selected facies. In one embodiment, a second property may be same as the first property. In one embodiment, when a facies selected at step 406 is a lower slope facies, the second property is a stratigraphic dip interpretation, and the distinguishing condition is that the average stratigraphic dip interpretation is in a range of 0° to 20°. In one embodiment, when a facies selected at step 406 is upper slope facies, the second property is resistivity and the distinguishing condition for the upper slope facies is that resistivity average is maximum in the upper slope facies among all facies. In another embodiment, when the facies selected at step 406 is upper slope facies, the second property is porosity and the distinguishing condition for the upper slope facies is that porosity average is minimum in this facies among all facies. For example, porosity could be evenly resampled from an interpolated core sample porosity, or it could be obtained from a borehole measurement.

In block 410, processor 280 carries out identifying one segment as a starting segment of the selected facies, among one or more segments which satisfy the distinguishing condition for the selected facies. The one segment should not have been already classified as a starting segment for another facies. In the case of a slope facies classification, such identification of the starting segments becomes a part of a coarse preliminary recognition of a single sequence of upper, middle, and lower slope facies in a top-down approach. In block 412, processor 280 checks whether or not any more facies are remaining. If yes, the flow goes back to block 406. If not, the flow goes to block 510, described below with reference to FIG. 5. Next, processor 280 carries out classification of each segment as one of the facies of the two closest starting segments. This is done by starting-segment neighborhoods, in a loop shown in FIG. 5.

Figure 5:
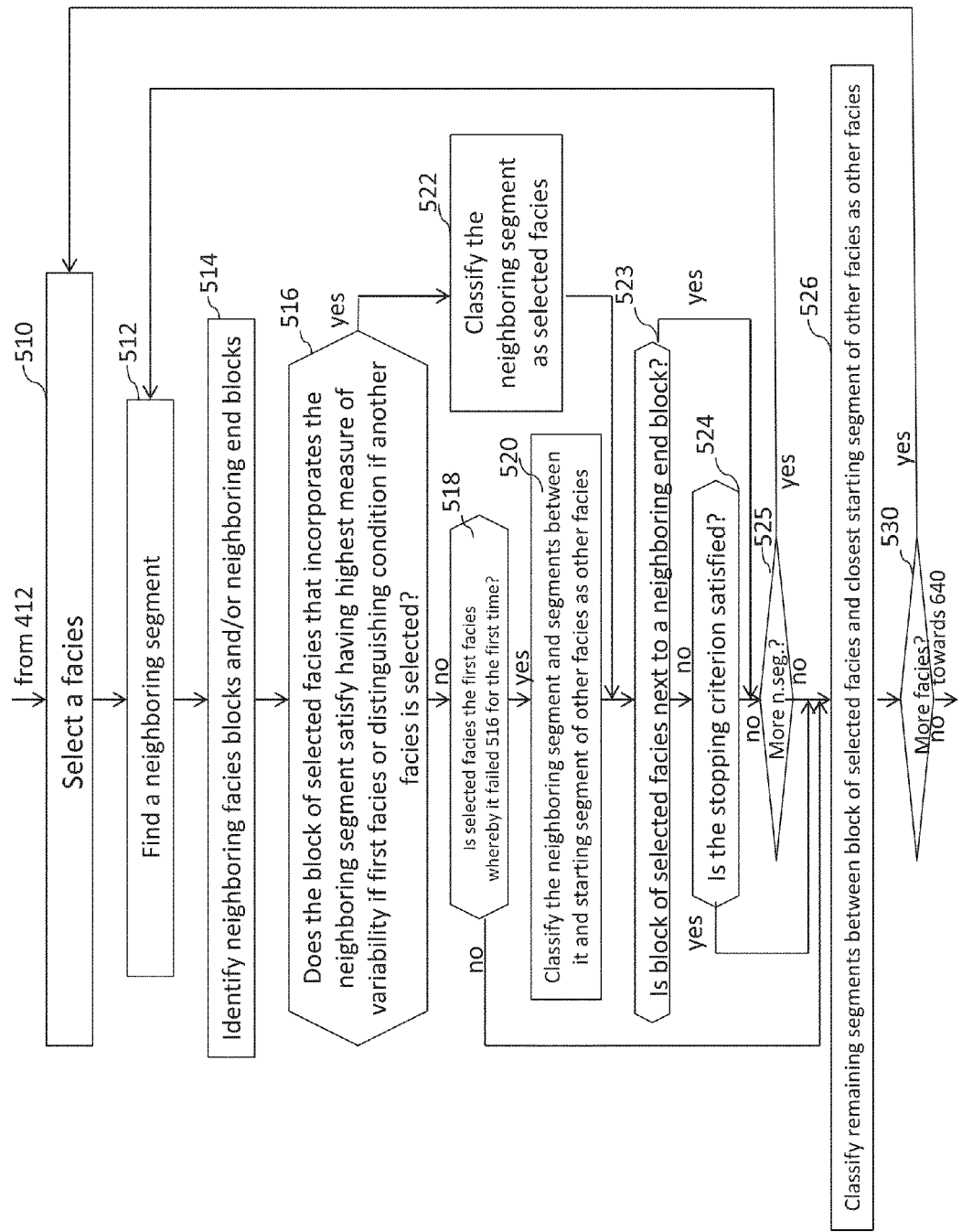
FIG. 5 is a flowchart showing details of the method in FIG. 3, in accordance with an embodiment.

Referring to FIG. 5, in block 510, a facies (referred to as "facies F") for consideration in the current pass of the loop is selected. Only those facies are considered, for which a starting segment has been identified. In general, the order of facies selection may be arbitrary as long as the possibility of enlargement on both sides of the starting segment are taken into account. In one embodiment, essentially all steps of FIG. 5 are applied to a selected facies whereby another facies had a closer starting segment on the same side of the facies selected in a previous pass of the steps, except that the steps in FIG. 5 which refer to the first facies are modified to apply to the selected facies if its segment blocks have another one of their boundaries not yet fixed through a contact to a facies selected in one of the previous passes of the loop of steps starting at step 510 through step 530. In another embodiment, the process of enlargement starts at a starting segment which is the closest to one end of data, in a pre-processing to the set of steps 510-530 of FIG. 5, with the choice of the starting segment not excluding its respective facies from being selected in the later set of steps 510-530. This pre-processing is done by adding a neighboring segment towards the respective end of data in a process similar to steps 512 to 525 in FIG. 5 except that the case when the verification step 516 is not satisfied is taken directly out of that sequence and onto the step 530, instead of moving onto the step 518. This is done so that potentially low-quality data at the respective end is excluded from classification when a neighboring segment fails to satisfy the verification process. For the slope facies, the first facies is selected in the first pass of the loop, and for the following passes the facies with the closest starting segment below the starting segment of the facies from the previous pass is selected, or, if the end of the data is reached and there are more starting segments with unassigned neighboring segments, the facies is selected among them as that with a starting segment being closest to the starting segment of the first facies. In one embodiment, the latter is the case of selecting the upper slope facies. Starting with block 512 and carrying out steps ending at step 530, processor 280 carries out iteratively enlarging the block of segments of the currently selected facies towards the closest among starting segments of other facies and ends of data, which in the case of the first facies involves doing so on both the side above and the side below the first facies block, until an enlargement stopping criterion is met for that facies. This is done by adding one by one a neighboring segment chosen at step 512 by beginning with a neighboring segment of the starting segment of the selected facies, after a verification process is carried out in steps 514 and 516, until an enlargement stopping criterion is satisfied (step 524). A neighboring segment is selected as a segment adjacent to the block of segments already classified to belong to the selected facies, whereby this segment is neither a starting segment for another facies nor located in a block of segments already identified to belong to a facies selected in this or any previous pass. If there is no segment remaining to be tried as a neighboring segment in the sequence of steps 512 through 524, this loop is exited at step 525 and the analysis of the neighborhood of the selected facies is taken through step 526 before moving on to the selection of another facies (if available, as checked in step 530) at the next execution of step 510. In step 526, the processor 280 classifies the remainder of unclassified segments among the last neighboring segment which underwent the verification steps in the loop and the segments between it and the closest starting segment on that side of the last neighboring segment which is opposite to where the starting segment of the selected facies is located, as belonging to the facies of such closest starting segment.

The verification process starts at step 514. At this step, a closest starting segment of other facies and the segments between it and the neighboring segment under consideration for adding in this enlargement are grouped into a so-called neighboring facies block of that other facies. This is referred to as identification of neighboring facies blocks, although such identification nomenclature does not imply classification itself. If there are no starting segments of other facies between the neighboring segment under consideration for adding and the end of data, processor 280 then identifies a block of segments as a neighboring end block if the block of segments does not contain starting segments of any of the facies and its two distinct boundaries are a boundary of the enlarged block of segments and an end of the obtained data.

Subsequently at step 516, processor 280 verifies, if the selected facies is the first facies, that the enlarged block of segments of the selected facies has an overall highest measure of variability of the first property (as discussed for block 402) when compared with the neighboring facies blocks and neighboring end blocks of segments adjacent to the enlarged block of segments. In the same step processor 280 verifies, if the selected facies is not the first facies, that the enlarged block of segments of the selected facies (referred to herein as the selected facies block) satisfies the distinguishing condition for the second property for the selected facies (as discussed for block 408) when compared with the neighboring facies blocks and the neighboring end blocks of segments adjacent to the enlarged block of segments.

If verification at step 516 fails, the enlargement in the direction of adding more segments situated between the block of segments of selected facies F and the neighboring facies block on the neighboring segment's side other than the block of facies F (with the facies of the neighboring facies block, referred to here as "facies F1") stops. There are no more neighboring segments for the block of segments of facies F on the side where the block of the facies F1 is located, because the neighboring segment under current consideration has failed the criteria for inclusion into the block of facies F. If F is not the first facies, then the nearest neighboring segment on the other side of the block of facies F has already been classified in one of the previously selected facies. If F is the first facies, and if this is the first time that a neighboring segment for consideration to be classified as F has failed verification, then there could be a neighboring segment on the other side of the facies F block which may satisfy conditions to be classified as F and continue enlargement. For these reasons, the process enters block 518, where processor checks whether it is satisfied that the selected facies F is the first facies and that this is the first time that verification at step 516 fails. If this is correct, the process enters step 520 next, while if this is incorrect, the loop for neighboring segment selection is exited and the process enters step 526. In both of these steps, processor 280 carries out classifying the segments located between the block of selected facies F and the starting segment of the neighboring facies F1 block, which have not been previously classified, as belonging to facies F1. In the case of step 520, the neighboring segment under current consideration has been rejected for inclusion into the block of facies F and thus will be classified as facies F1. In step 526, the same will be the case if the process came to step 526 by failing the condition in step 516, but it should be noted, as FIG. 5 shows, that step 526 applies also to those threads of the process which exited the neighboring segment selection loop with the last neighboring segment considered being classified as facies F (e.g., a thread that passes through step 522 and exits through a stopping criterion or through no further availability of neighboring segments due to an end of data or a starting segment of another facies).

If verification at step 516 is successful, the process enters step 522 where processor 280 classifies the neighboring segment under consideration as belonging to the selected facies F. After that, the process joins the thread that finished step 520 and gets to step 523. Step 523 checks whether, in case the selected facies is not the first facies, the block of the selected facies has a neighboring end block. If this is correct, the process skips step 524 where it is investigated if a stopping criterion is met, and continues at step 525 to the selection of the next neighboring segment. This is of importance for facies with a block by an end of data, selected in the method of picking facies with closest starting segments to the previously selected facies, because they have only one neighboring facies block. Enlargement in this case will stop when another neighboring segment is not available (e.g., at end of data) or when verification at step 516 fails. If the query of step 523 is not satisfied, then the processor moves on to step 524. The enlargement stopping criterion includes a requirement that in the neighboring facies blocks of segments adjacent to the enlarged block of segments for the facies of the starting segment contained in the respective neighboring facies' blocks of segments: 1) the distinguishing condition of step 408 is satisfied if the facies of the neighboring facies block is not the first facies, and 2) the measure of variability of the first property is maximum if the facies of the neighboring facies block is the first facies. If it is not satisfied, the process moves to step 525, thus starting another enlargement iteration of selecting a neighboring segment of the selected facies block if such a segment is available. If the stopping criterion is satisfied, enlargement stops and the process moves to step 526 for classification of remaining segments between the selected facies block and the starting segment of the neighboring facies F1 block as already discussed.

After step 526, processor 280 checks if there are any other facies which have starting segments but have not yet been selected (in step 530 for continuation of the loop which starts at 510). If so, processor 280 selects one of remaining facies at step 510 and carries out iteratively enlarging a block of segments of the selected facies by carrying out steps 512 through 530 again. The iterative enlargement is carried out by adding a segment at an end of the block of segments of the selected facies, whereby the end does not contact a boundary between the selected facies and any of the facies selected in previous passes of the loop at step 510, such that the verification step 516 is satisfied. In one embodiment, the second pass of the loop 512 to 530 will have that facies selected which has its starting segment closest below the first facies. The loop that started at step 510 is exited at step 530 when there are no more remaining facies among those which have starting segments but have not yet been selected.

In the case of slope facies, it is optional to carry out another iterative enlargement of the middle slope facies in the direction towards the top end of data, i.e., at the boundary to the upper slope facies. This step is referred to as the fine-tuning of the boundary between the middle slope and upper slope facies. This is done by adding a neighboring segment to the middle slope facies block from the upper slope facies block after a verification that includes verifying 1) that the neighboring segment is not a starting segment, 2) that, among the block of the lower slope facies and the new blocks of the upper slope and middle slope facies, the measure of variability of the first property is the highest in the middle slope facies block and the distinguishing condition for the upper slope facies is satisfied in the upper slope facies block, and 3) that, depending on whether the second property with the upper slope as selected facies is resistivity, or conductivity or porosity, the segment-average of the second property over the new block of the upper slope facies is higher (for resistivity) or lower (for conductivity or porosity) than over the block of the upper slope facies before the segment was taken out of it to be considered for enlargement of the middle slope facies block. The enlargement stops once this verification fails.

Figure 10:
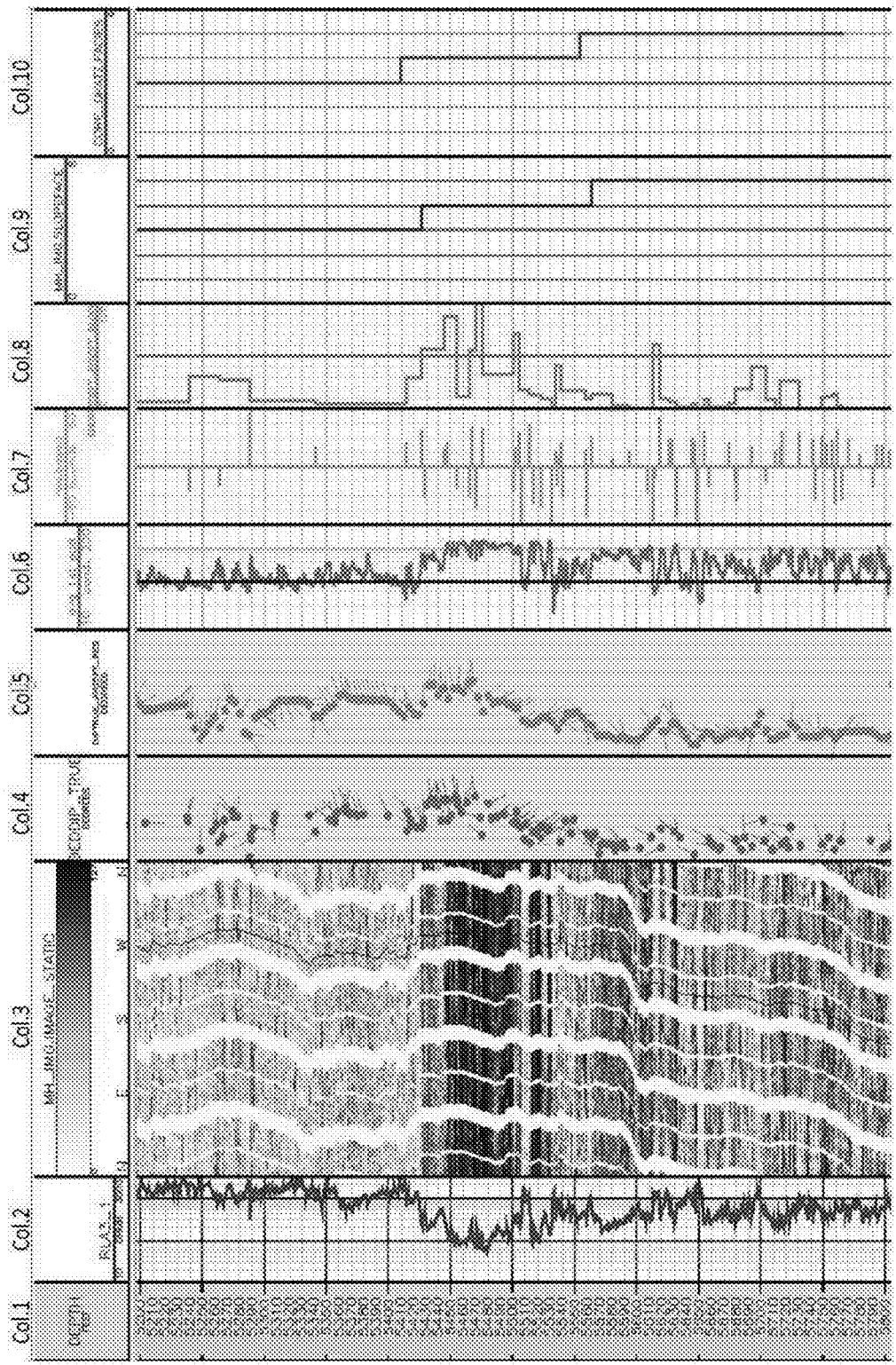
FIG. 10 illustrates classification results of using a top-down approach, in accordance with an embodiment.

At this point, a coarse classification, shown in Column 9 of FIG. 10, has been achieved, referred to also as a top-down approach classification because it assumes that the upper, middle and lower slope facies occur at most once down the well.

A step-wise reclassification is done to allow for the reentrance phenomenon, where separate blocks of one facies may occur in the well. The reclassification starts with information obtained on each segment without the context of its relative position in the well and for that reason is referred to as the bottom-up approach. Such information is used in initial stages of reclassification, and then put in a context of the top-down approach classification to produce a final classification. Reclassifying individual segments is based on at least one of respective measure of variability of the one or more properties interpreted or derived from the obtained data for each individual segment and one or more segments neighboring the individual segment, respective segment lengths, and respective relative positions of each individual segment to boundaries between the first facies and the additional facies in the top-down approach classification, to produce a revised stratigraphic classification in terms of the upper slope, the middle slope, the lower slope, and/or the platform facies. It is to be noted that additional criteria other than those listed above may be used, as can be contemplated by one of ordinary skill in the art in view of this disclosure. In one embodiment for slope facies classification, reclassification is shown schematically in FIG. 6.

Figure 6:
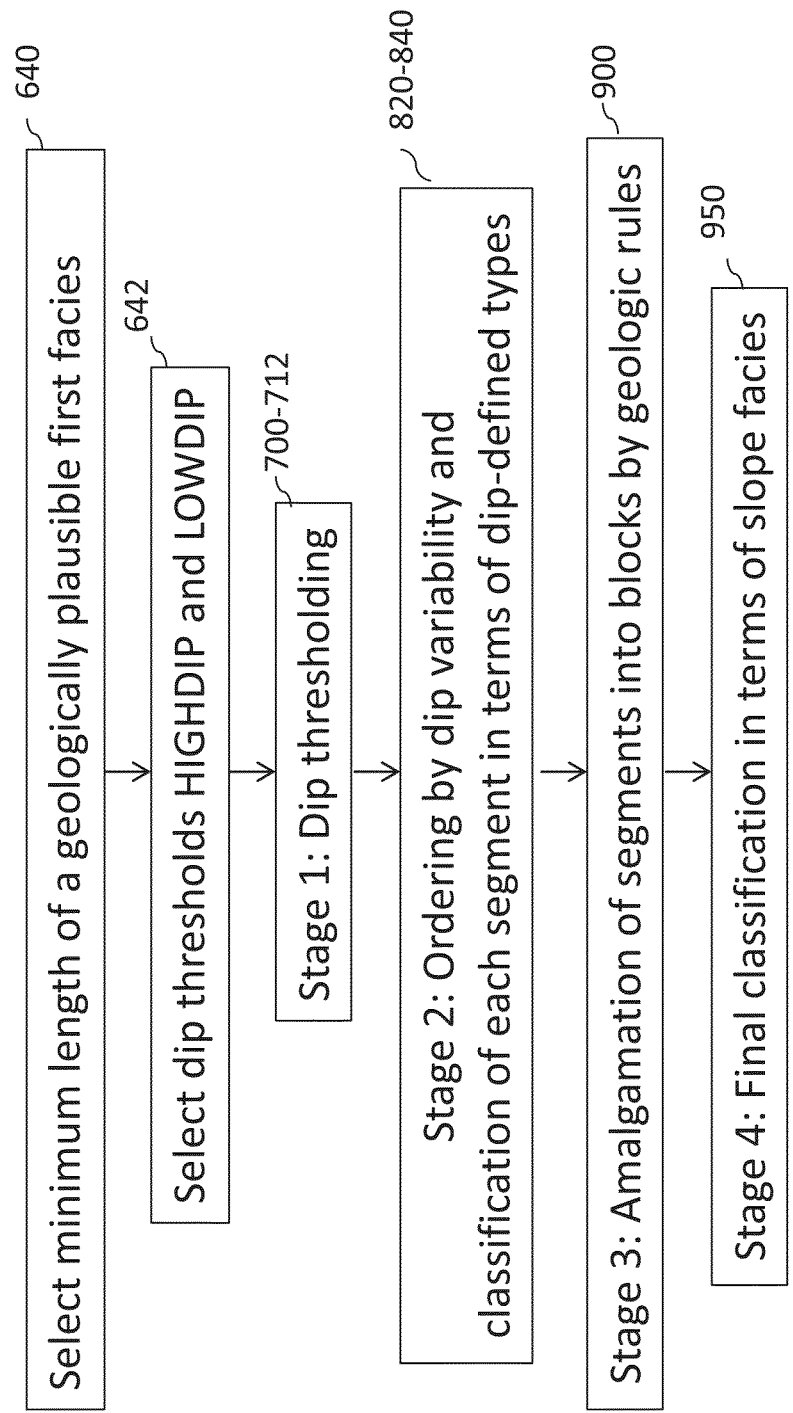
FIG. 6 is a flowchart showing details of a reclassification process, in accordance with an embodiment.

Referring to FIG. 6, in step 640, processor 280 carries out selecting a minimum length, which pertains to a reentrant first facies (middle slope facies) block. This selection can be obtained from previous geological knowledge as a predefined geologically known minimum length of the first facies, such that any longer interval in the first (middle slope) facies is expected to exhibit stratigraphic dip characteristic of the middle slope facies, i.e., to have regions of dip higher than a certain value and a high measure of dip variability when compared to any low dip facies block. Alternatively, an automatic selection can be made from the length of the middle slope facies in the top-down approach classification at the exit of step 530, prior to the optional step of fine-tuning the boundary between the middle and upper slope. In one embodiment, the selected minimum length is 10 m, although different geological formations will warrant different thresholds on the selected minimum length, generally in the range of 2 m to 50 m, as can be contemplated by one of ordinary skill in the art in view of this disclosure. In step 642, processor 280 carries out selecting a high-dip threshold ("HIGHDIP") such that any interval longer than the selected minimum length in a region of consecutive geologically identified segments of the middle slope facies is expected to exhibit regions of dip higher than the high-dip threshold. In one embodiment, the high-dip threshold is 35°. Also in step 642, a low-dip threshold ("LOWDIP") is selected. For the case when the lower slope facies property is stratigraphic dip interpretation, this threshold is selected as the highest dip in the range of dip in the distinguishing condition for the lower slope facies. In other cases, a value between 15° and 20° can be input as a parameter to fix the LOWDIP selection. From this point, reclassification proceeds in four stages: 1) dip thresholding (step referred to as Stage 1 in FIG. 6, with steps 700 through 712 detailed in FIG. 7); 2) ordering by a measure of dip variability and classification in terms of dip-defined types (step referred to as Stage 2 in FIG. 6 and detailed in FIG. 8), where processor 280 carries out classifying each segment in the consecutive geologically identified segments as one of dip-defined types, by ordering by a dip value and by the measure of variability of the middle-slope property; 3) amalgamation of segments into blocks of different dip-defined types by geologic rules (step referred to as Stage 3 in FIG. 6), and 4) final classification stage, which relates the dip-defined type of each block to the slope facies by geologic rules and produces the final stratigraphic classification of slope facies (step referred to as Stage 4 in FIG. 6). In this embodiment, reclassification uses the information on 1) dip maximum in each segment and a measure of dip variability for each segment to assign a dip-defined type to each segment; 2) geologic rules on what dip-defined types of segments can be amalgamated into a single dip-defined type block (taking also account of their thicknesses); 3) geologic rules on where in the coarse segmentation a particular dip-defined type of segment can be in order to be amalgamated with a neighbor; 4) block average of the second property with the upper slope as a second facies, for all blocks formed at the end of stage 3; and 5) geologic rules on how the amalgamated blocks translate into slope facies based on their dip type, resistivity or on their length.

In one embodiment, the dip-defined types are: 1) low-dip type, such that all dips in the given segment of this type are less than the selected LOWDIP threshold; 2) variable intermediate-dip type, where there are dips in the segment that are higher than the selected low-dip threshold but none are higher than the high-dip threshold, and the measure of dip variability is higher than in any of the segments of the low-dip type; 3) variable high-dip facies, where there are dips in the segment that are higher than the high-dip threshold, and the measure of dip variability is higher than in any of the segments of the low-dip type; 4) stable intermediate dip facies, where there are dips in the segment that are higher than the low-dip threshold but none are higher than the high-dip threshold, and the measure of dip variability is lower than in some of the segments of the low-dip type; and 5) stable high dip facies, where there are dips in the segment that are higher than the high-dip threshold, and the measure of dip variability is lower than in some of the segments of the low-dip type.

Figure 7:
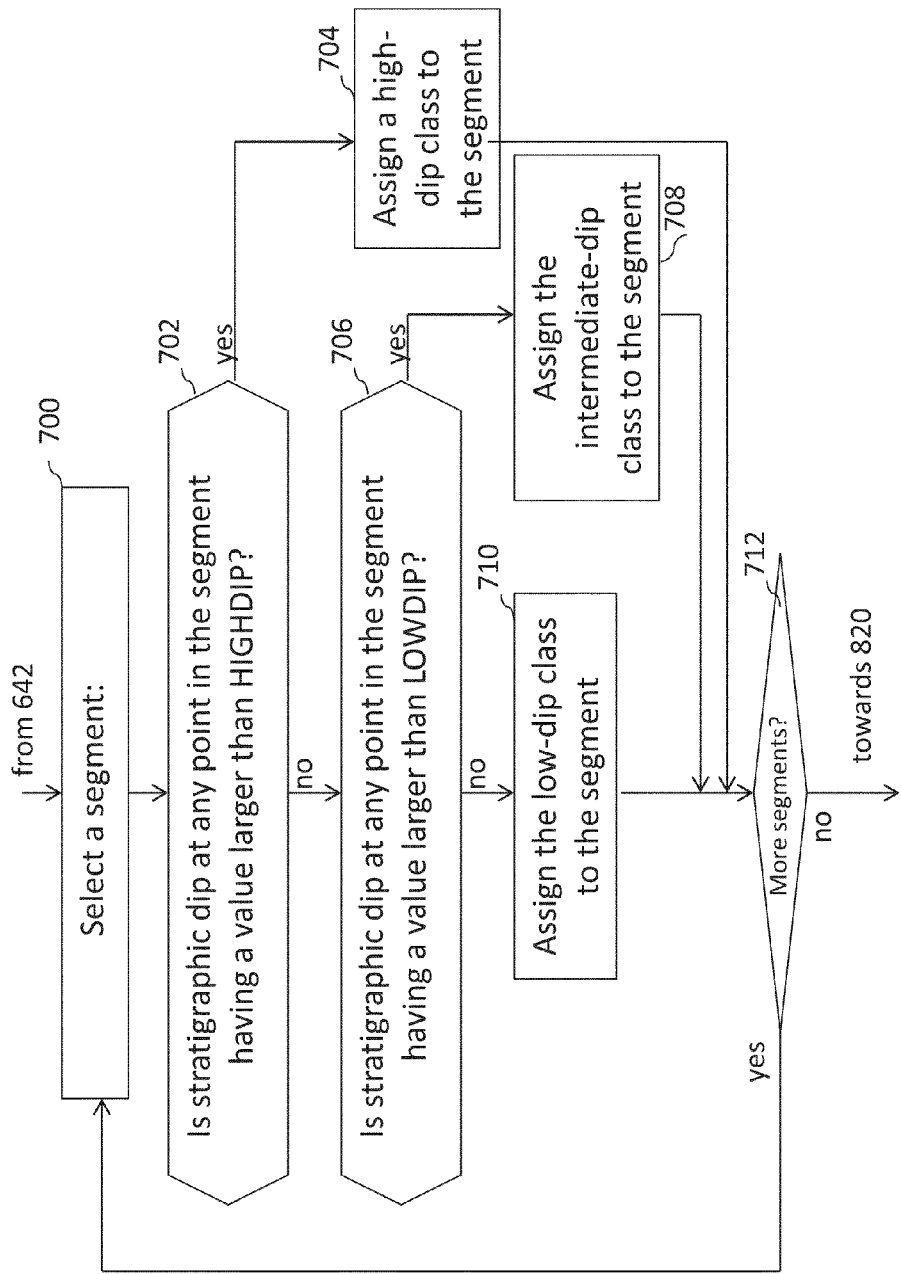
FIG. 7 is a flowchart showing details of Stage 1 of the reclassification process in FIG. 6, in accordance with an embodiment.

In an embodiment of the reclassification Stage 1 shown in FIG. 7 by way of example only, each segment is assigned a class of a dip type, among the low-dip, intermediate dip and high-dip classes, whereby the classes are defined as follows. The low-dip class coincides with the low-dip type, the intermediate-dip class includes the variable intermediate-dip type and the stable intermediate-dip type, and the high-dip class includes the variable high-dip type and the stable high-dip type. Assignment to one class for each segment (selected in step 700) is done by testing whether stratigraphic dip at any point in the segment has a value larger than HIGHDIP (step 702) and, if it has not, whether it has a value larger than LOWDIP (step 706), with assignments appropriate for classes definition. It is to be understood that the choice of order in which steps 702 and 706 and appropriate assignments are made may be arbitrary as long as the assignments are in agreement with classes definition, and that the order of segment selection may be arbitrary.

Figure 8:
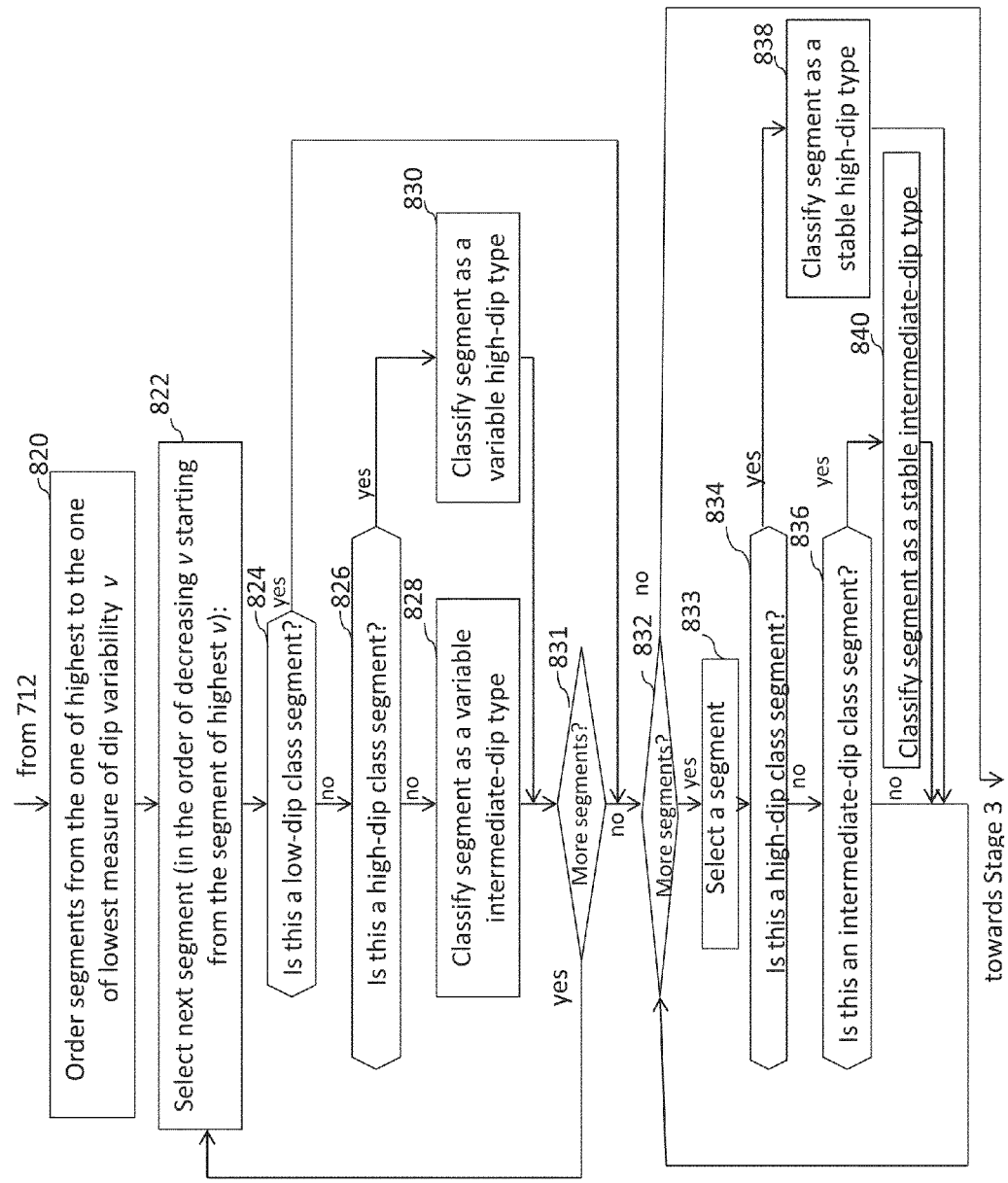
FIG. 8 is a flowchart showing details of Stage 2 of the reclassification process in FIG. 6, in accordance with an embodiment.

In an embodiment of the reclassification Stage 2 shown in FIG. 8 by way of an example, the assignment of dip types is done by first ordering segments from the one of highest to the one of lowest measure of dip variability in step 820, identifying variable dip types in the intermediate-dip (step 828) and high-dip (step 830) class segments in this order until a low-dip class segment is encountered (step 824), and assigning stable dip type among the remaining intermediate-dip (step 840) and high-dip (step 838) class segments. The dip variability among the stable dip type segments is lower than that of any segments that were classified as of variable high-dip and variable intermediate-dip type.

In one embodiment, reclassification in Stage 3 is applied starting from above downward, and amalgamation rules are applied to each block of same dip-defined type segments that is shorter than the minimum selected length of step 640. Amalgamation rules are based on geological observations and represent rules of reassigning dip types to segments or to blocks of same dip type segments based on the block thickness and block dip type, and on present thickness and dip type of its neighbor blocks, as well as information on where the given block is located in the top-down approach classification. Amalgamation rules include specifying that a short block should be amalgamated to its neighbors (i.e., assigned the same type as its neighbors) when its neighboring block above and below are blocks of same type, provided that the bottom block is thicker than the selected minimum length. For the case when the neighboring blocks are of same dip type but the length of the bottom block is less than the minimum selected length, amalgamation rules specify the short block is to be amalgamated to its neighbors if the neighboring blocks are of a variable high-dip type or if a compatibility condition applies.

The compatibility condition includes for example a rule that applies to a block that is not of a low-dip type nor of a stable intermediate-dip type, if it is located in the region assessed as lower slope in the top-down approach classification and either the neighboring blocks are of a low-dip type, or it is satisfied that the neighboring block from above is of a stable intermediate-dip type and the block in question for amalgamation is not of a variable high-dip type. This rule helps protect occurrence of stable intermediate-dip type and of variable high-dip type blocks, because they have a role at Stage 4 in recognizing upper and middle slope facies. Additional geologic rules may be applied for other cases of short blocks and their neighbors, and may include amalgamation rules which specify when a segment from the neighboring block at the boundary to the short block is to be amalgamated to the short block, that is, assigned the same dip type as the short block. Such rules include a requirement that an enlargement of a short block results in a block that is larger than the minimum selected length and that the neighboring block from which the segment was taken for amalgamation to the short block is still larger than the minimum selected length. The enlargement is done at most once per short block and performs addition of one adjacent segment if this satisfies length requirements, or two adjacent segments from the same neighboring block. These rules are referred to as amalgamation rules for finger enlargement. In one embodiment, performing amalgamation from above downward, finger enlargement is considered first from segments of the neighboring block above. In certain cases, when finger enlargement cannot be applied, additional geologic rules may be implemented to amalgamate the short block with the segment above or the segment below (referred to as default rules).

In one embodiment, the final identification of the upper slope is done by identifying the blocks of resistivity higher than in any segments of the low-dip type or the stable intermediate-dip type. Next, final identifying of the middle slope facies from the lower slope and platform facies is carried out based on a threshold onset of dip variability in the middle slope facies and is carried out by processor 280 in the following order. The low-dip type blocks are identified as lower slope, and the remaining variable intermediate dip type and variable high dip type blocks which were not identified as the upper slope are identified as the middle slope. The remaining segments of the stable intermediate dip and stable high dip are identified as lower slope unless they satisfy at least one of the following conditions, in which case they are classified as middle slope. These conditions are: 1) that their nearest neighbors from above and below are both either of upper slope or of middle slope, or 2) they occur at beginning of data on top of a block of upper or middle slope, or 3) they occur immediately below a block of middle slope facies and the block they form is shorter than the middle slope facies block immediately above. The third condition helps implement a geologic rule of a sharp onset of middle slope.

The platform facies is identified in one embodiment from those segments of the previously identified lower slope facies which have the upper slope at both the upper and lower boundary. It will be appreciated in the art, that a refinement on the identification of platform facies can be done by also using other data (e.g., gamma-ray, porosity or image-derived homogeneity data), other geologic rules, or regional knowledge (e.g., from core data or outcrops), which correlates occurrence of platform facies in data from another location to the obtained data under consideration.

EXAMPLES

Figure 11:
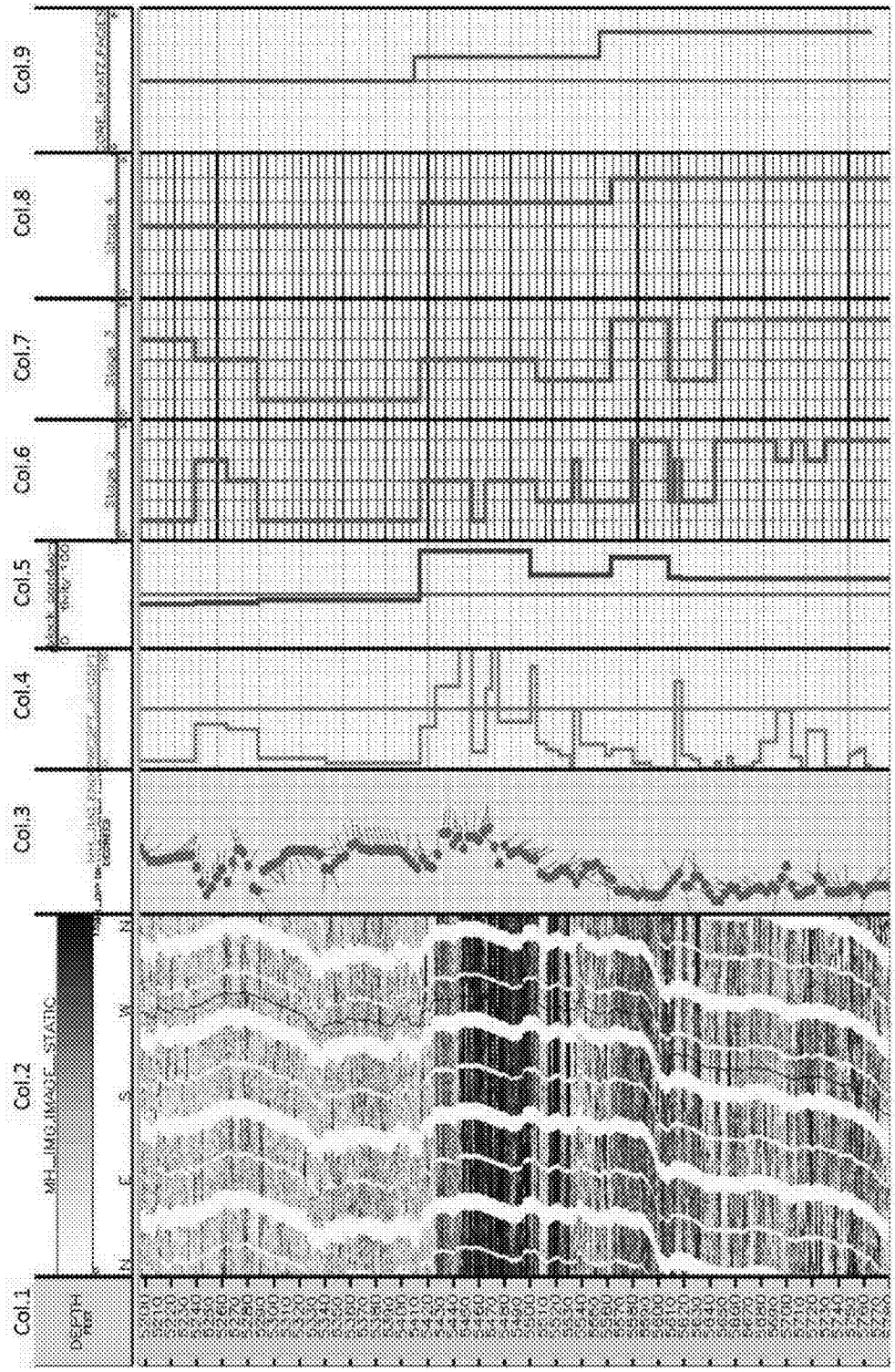
FIG. 11 illustrates plots of exemplary data used for predicting slope facies using a bottom-up approach, in accordance with an embodiment.

The processes carried out by processor 280 described in flowcharts of FIGS. 3-8 are appreciated by way of the example classification scheme presented below and described with reference to FIGS. 9-11. FIGS. 9-11 illustrate columns showing data obtained by sensors of probe 110 and additional data or properties interpreted or derived from the obtained data to produce stratigraphic classification of facies in geological formation 100.

In FIG. 9, an example of obtained data is shown for the region classified in core as middle slope facies in a carbonate environment. In FIG. 9, Column 1 indicates the depth reference log in feet, Column 2 displays an intermediate resistivity log measured with a tool such as HIGH-RESOLUTION LATEROLOG ARRAY TOOL (HRLT)™ provided by Schlumberger of Houston, Tex., Column 3 displays a resistivity image measured with the FMI™ tool, Column 4 shows bedding dips (stratigraphic dip log) obtained by image interpretation, on the dip scale from 0 to 90°, with orientation corresponding to the interpreted bedding azimuth, Column 5 displays nonzero values at locations of boundaries found from resistivity image segmentation, and Column 6 displays the calculated measure of variability for the smoothed stratigraphic dip, for segments obtained from boundaries in Column 5 disregarding those boundaries which are immediately below segments shorter than 3 ft.

Referring to FIG. 10, an example of a top-down approach for an initial classification to predict slope facies is illustrated. In FIG. 10: Column 1 displays the depth reference in feet, Column 2 displays an intermediate resistivity log measured with the HRLT™ tool, although other types of resistivity logs and tools could be used, Column 3 displays a resistivity image log measured with the FMI™ tool, although other types of tools may be used, Column 4 shows bedding dips (stratigraphic dip log) obtained by image interpretation, on the dip scale from 0° to 90°, with orientation corresponding to the interpreted bedding azimuth, Column 5 shows an interpolated and smoothed dip log, with the scale 5 ft used for smoothing, Column 6 shows the average (conductivity) value of the image log from the first pad sensors, Column 7 represents boundaries obtained from image log segmentation by displaying nonzero values at locations of boundaries and zero values everywhere else, Column 8 represents the calculated measure of variability for the smoothed stratigraphic dip log of Column 5, whereby the measure of dip variability was calculated with help of Eq. (3) applied to the 2-ft scale wavelet coefficients of the smoothed stratigraphic dip data, Columns 9 and 10 illustrate two classifications of upper, middle, and lower slope (represented for display purposes in this layout by values 3, 4 and 5, respectively), whereby the classification in Column 9 was obtained by the embodiment of the method described for obtaining a top-down approach classification and the classification in Column 10 is based on visual observations in core and was recorded prior to the inception of this method. It is to be noted that advantageously, Column 9 showing the top-down approach classification substantially matches the classification obtained from visual core classification in Column 10.

Referring to FIG. 11, an example of a bottom-up approach to predict slope facies is illustrated. In FIG. 11, Column 1 displays the depth reference in feet, Column 2 displays a resistivity image log measured with the FMI™ tool. Column 3 shows an interpolated and smoothed dip log, with the scale 5 ft used for smoothing. Column 4 represents the calculated measure of variability for the smoothed stratigraphic dip log of Column 5, whereby the measure of dip variability was calculated with help of Eq. (3) applied to the 2-ft scale wavelet coefficients of the smoothed stratigraphic dip data. Column 5 represents average block conductivity (from the first pad image sensors) for blocks between boundaries defined by change in the dip-defined type classification value after completion of Stage 3. Column 6, Column 7 and Column 8 represent resulting classification from Stage 2, 3 and 4 of reclassification, respectively, whereby Stage 4 results are represented in terms of slope facies of upper, middle, and lower slope (represented for display purposes in this layout by values 3, 4 and 5, respectively), and Stage 2 and Stage 3 results are in terms of dip-defined types, which are displayed by the following values. Low-dip type is represented by value 5, variable intermediate-dip by value 4, variable high-dip type by value 3, stable intermediate dip by value 2 and stable high-dip by value 1. Column 9 shows the core classification and is based on visual observation in core.

Processor 280 carries out amalgamation according to minimum length requirements (e.g., 10 m or 32.8 ft) and geologic rules that take into account one or more parameters or conditions. An example of amalgamation of short blocks can be seen in FIG. 11 in Column 7 in comparison to Column 6 at a location of a short block at 5460 ft, for which the block above and the block below have mutually the same dip type and the lower block is not a short one. The block of Stage 2 (Column 6) around 5690 ft is amalgamated to its neighbors (mutually of same dip-type) in an example of a compatibility condition. The variable intermediate-dip type block around 5610 ft is also amalgamated by application of a compatibility condition, because its short neighboring block of stable intermediate-dip type at 5605 ft does not satisfy amalgamation rules for finger enlargement from either its neighbor above or the one below. This may be understood by viewing segment boundaries at changes of measure of variability of dip in Column 4. The neighboring block above the one around 5605 ft, having been a short block at Stage 2 around 5590 ft, has first undergone an enlargement itself in Stage 3, by one segment around 5570 ft from its neighboring block above. However, if this block was to lose its two lowest segments around 5600 ft for the finger enlargement of the short block around 5605 ft, it would become a short block again and thus not satisfy finger enlargement requirements for the block at 5605 ft. Amalgamation by finger enlargement from below is not possible for the block around 5605 ft either because the neighboring block below is a short block too. Finally, changes from the Stage 2 to Stage 3 results in the region 5200-5260 ft are also examples of amalgamation by finger enlargement from above, first for the short block of Stage 2 around 5240-5260 ft (with the emergence of enlarged block at 5200-5260 ft of a variable intermediate-dip type, which is situated as a bottom neighbor for a stable high-dip type block not shown) and then for the short block around 5270 ft.

An example of the Stage 4 reclassification where a block of a stable intermediate-dip type is assigned a middle slope facies classification in respect of the condition of a sharp onset of middle slope so that such a block cannot be larger than already recognized middle slope, is given in Column 8 of FIG. 11 for the block of Stage 3 of Column 7 located at around 5510-5560 ft. If this block had been larger than its middle-slope neighbor from above, it would have been classified as lower slope in the final classification.

Geological formation 100 may be selected from a wide range of sites. Using different embodiments, advantageously excellent agreement between the automated prediction and core classifications from actual visual observations (e.g., columns 9 and 10 in FIG. 10) is reached to an accuracy better than 5 ft.

Those skilled in the art will appreciate that the disclosed embodiments described herein are by way of example only, and that numerous variations will exist. The invention is limited only by the claims, which encompass the embodiments described herein as well as variants apparent to those of ordinary skill in the art.

What is claimed is:

1. A method for analyzing characteristics of a geological formation, comprising:
   obtaining, at a processor, data representative of at least one of stratigraphic, structural, or physical characteristics of the geological formation;
   applying, at the processor, a wavelet transform to at least a portion of the obtained data or data interpreted or derived from the obtained data to derive one or more wavelet transform coefficients representative of the obtained data;
   segmenting, at the processor, at least one or more of the obtained data or data interpreted or derived from the obtained data into segments;
   determining, at the processor, a measure of variability of the obtained data or the data interpreted or derived from the obtained data over each segment at one or more scales of the wavelet transform, wherein the measure of variability is based at least on the wavelet transform coefficients corresponding to each segment, and wherein the measure of variability of the obtained data or one or more properties interpreted or derived from the obtained data is obtained as a segment average of squares of magnitude of wavelet transform coefficients at the one or more scales of the wavelet transform; and
   analyzing, at the processor, each segment based on the determined measure of variability to produce a stratigraphic, structural, or physical classification of the geological formation, wherein the stratigraphic, structural, or physical classification of the geological formation is used to identify certain depositional environments of interest for oil and gas exploration and the certain depositional environments are used to determine distributions of reservoir properties, and wherein the distributions of reservoir properties are used to determine well placement as part of drilling operations for the oil and gas exploration.

2. The method of claim 1, wherein the geological formation is a subterranean formation and the obtaining is carried out using one or more sensors of a probe inserted into a borehole of the subterranean formation.

3. The method of claim 1, wherein the analyzing comprises:
selecting for a first facies, in a plurality of facies of the geological formation, a first property among the one or more properties interpreted or derived from the obtained data that has an expected or known highest measure of variability for the first facies; and
identifying a segment having a maximum value of the measure of variability of the selected first property among the segments as a starting segment for the first facies.

4. The method of claim 3, wherein the analyzing further comprises:
selecting for each facies in remaining facies of the plurality of facies, a second property among the one or more properties that satisfies a distinguishing condition of either an expected range of segment average, a maximum segment average value, or a minimum segment average value for a facies under consideration in the remaining facies over regions belonging to the facies under consideration based on prior geologic knowledge;
identifying in each facies in the remaining facies one segment that is not already classified as a starting segment for any facies, such that in each of the respective facies the distinguishing condition is satisfied for the one identified segment, wherein the one identified segment in each of the respective remaining facies becomes a starting segment of the respective facies.

5. The method of claim 4, wherein the first facies comprises a block of segments including the starting segment, the method further comprising:
starting from the first facies, selecting one by one a facies, and for each selected facies, beginning from a block of segments identified as belonging to the selected facies, carrying out:
iteratively enlarging the block of segments of the selected facies until an enlargement stopping criterion is met by adding one by one a neighboring segment that is adjacent to the block of segments identified as belonging to the selected facies after verifying eligibility of the neighboring segment; and
classifying all segments which have not been classified yet and which are in between a last eligible neighboring segment and a starting segment of another facies that is a closest starting segment to the starting segment of the selected facies on same side as the last eligible neighboring segment as belonging to the another facies.

6. The method of claim 5, wherein the verifying eligibility of the neighboring segment to the block of segments of the selected facies includes:
identifying a block of segments as a neighboring facies block if the block of segments comprises a closest starting segment, among starting segments of all facies other than the selected facies, to the block of segments of the selected facies on either side of the block of segments of the selected facies and all segments in between the enlarged block of segments of the selected facies and the starting segment of the closest starting segment;
identifying a block of segments as a neighboring end block if the block of segments does not contain starting segments of any of the facies and its two distinct boundaries are a boundary of the enlarged block of segments and an end of the obtained data;
verifying, if the selected facies is the first facies, that the enlarged block of segments has an overall highest measure of variability of the first property when compared with the neighboring facies blocks and neighboring end blocks of segments adjacent to the enlarged block of segments; and
verifying, if the selected facies is a second facies, that the enlarged block of segments satisfies the distinguishing condition for the second property when compared with the neighboring facies blocks and the neighboring end blocks of segments adjacent to the enlarged block of segments.

7. The method of claim 5, wherein the enlargement stopping criterion includes a requirement that for each neighboring facies block of the block of the selected facies, if the facies of a starting segment contained in the neighboring facies block is the first facies, the measure of variability of the first property is highest in that block among the blocks which include the selected facies block and its neighboring facies blocks, and that, if the facies of a neighboring facies block is a second facies, the distinguishing condition is satisfied in the neighboring facies block for the facies of the starting segment contained in that neighboring facies block of segments.

8. The method of claim 5, wherein the second property is porosity interpolated from a core sample porosity to yield an evenly sampled data and the first property is a stratigraphic dip obtained from an outcrop formation.

9. The method of claim 5, wherein the first facies is a middle slope facies in a carbonate environment, and the remaining facies are one or more of upper slope facies, lower slope facies, and platform facies.

10. The method of claim 9, wherein the second property when the selected facies is the lower slope facies is a stratigraphic dip interpretation of the lower slope facies and the distinguishing condition is that an average of the stratigraphic dip interpretation is in a range of 0° to 20°.

11. The method of claim 9, wherein the second property when the selected facies is upper-slope facies is resistivity or conductivity, the first property is stratigraphic dip of the first facies, and the second property when the selected facies is lower slope facies is stratigraphic dip of the lower slope facies.

12. The method of claim 9, wherein the second property when at least one of the remaining facies is upper-slope facies is porosity.

13. The method of claim 9 further comprising:
reclassifying individual segments based on at least one of the measure of variability of the one or more properties interpreted or derived from the obtained data for each individual segment and one or more segments neighboring the individual segment, respective segment lengths, and respective relative positions of each individual segment to boundaries between the first facies and the additional facies, to produce a revised stratigraphic classification in terms of the upper slope, the middle slope, the lower slope, and/or the platform facies.

14. The method of claim 13, wherein the reclassifying comprises:
selecting a minimum length of the first facies, such that any longer interval in the first facies is expected to exhibit stratigraphic dip characteristic of the middle slope facies;
selecting a high-dip threshold such that any interval longer than the selected minimum length in a region of consecutive geologically identified segments of the middle slope facies is expected to exhibit regions of dip higher than the high-dip threshold; and
assigning each segment as one of a dip-defined type, by ordering by a dip value and by the measure of variability of the middle-slope property.

15. The method of claim 14, wherein the selected minimum length is 10 m and the high-dip threshold is 35°.

16. The method of claim 3, wherein the first property is calculated from either a resistivity image log, a density image log, or an acoustic image log.

17. The method of claim 16, wherein the segments in the segmented obtained data are classified as belonging to the first facies in an order of decreasing measure of variability of the first property until a stopping condition is met.

18. The method of claim 17, where the stopping condition is satisfied if the measure of variability of the first property over a segment currently under consideration to be classified as belonging to the first facies is lower than a value of the measure of variability of the first property over at least one of the segments previously classified as belonging to facies other than the first facies.

19. The method of claim 1, wherein the obtained data is associated with one or more signals, and the obtained data include at least one of a stratigraphic dip interpretation, a porosity, and a resistivity or a conductivity of the geological formation.

20. The method of claim 1, wherein the one or more scales are of an order of scale in a range of 1/32 ft to 32 ft.

21. The method of claim 1, wherein the wavelet transform is performed with a Daubechies wavelet with at least two vanishing moments.

22. The method of claim 1, wherein the obtained data or properties interpreted or derived therefrom are depth-readjusted after applying the wavelet transform.

23. A non-transitory, computer readable medium having stored thereon instructions for analyzing characteristics of a geological formation comprising machine executable code which when executed by at least one processor, causes the processor to perform steps comprising:

obtaining data representative of at least one of stratigraphic, structural, or physical characteristics of the geological formation;

applying at the processor a wavelet transform to at least a portion of the obtained data or data interpreted or derived from the obtained data to derive one or more wavelet transform coefficients representative of the obtained data;

segmenting at least one or more of the obtained data or data interpreted or derived from the obtained data into segments;

determining a measure of variability of the obtained data or the data interpreted or derived from the obtained data over each segment at one or more scales of the wavelet transform, wherein the measure of variability is based at least on the wavelet transform coefficients corresponding to each segment, and wherein the measure of variability of the obtained data or one or more properties interpreted or derived from the obtained data is obtained as a segment average of squares of magnitude of wavelet transform coefficients at the one or more scales of the wavelet transform;

analyzing each segment based on the determined measure of variability to produce a stratigraphic, structural, or physical classification of the geological formation; and storing in a memory device the stratigraphic, structural, or physical classification of the geological formation, wherein the stratigraphic, structural, or physical classification of the geological formation is used to identify certain depositional environments of interest for oil and gas exploration and the certain depositional environments are used to determine distributions of reservoir properties, and wherein the distributions of reservoir properties are used to determine well placement as part of drilling operations for the oil and gas exploration.

* * * * *